Jan. 17, 1967     J. R. HALE     3,298,402
METHOD FOR FABRICATING SPACE STRUCTURES
Filed Feb. 15, 1965
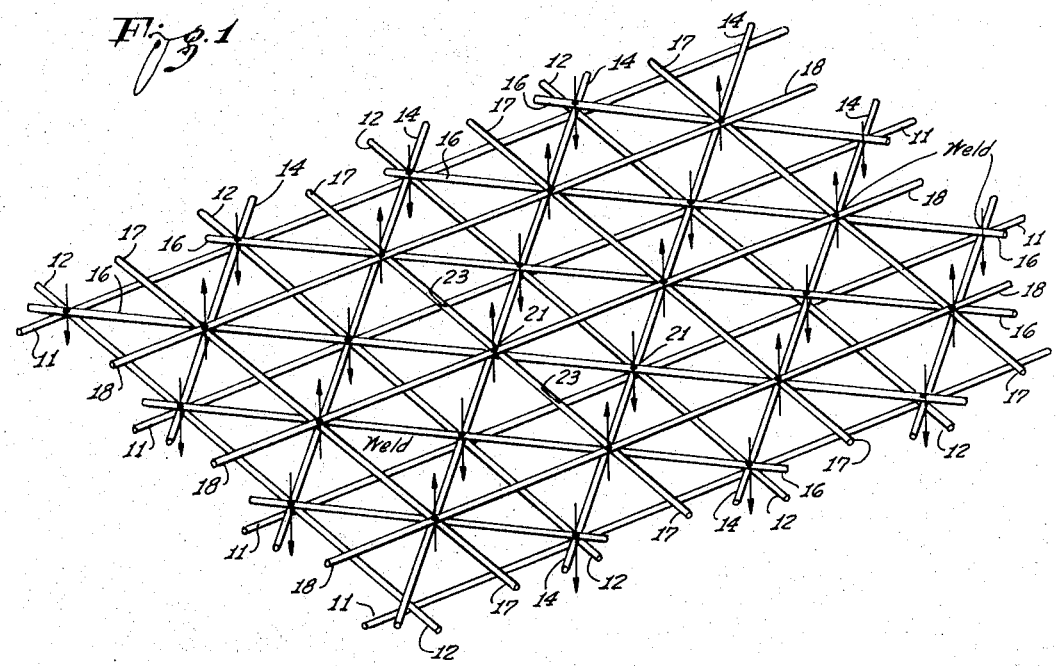
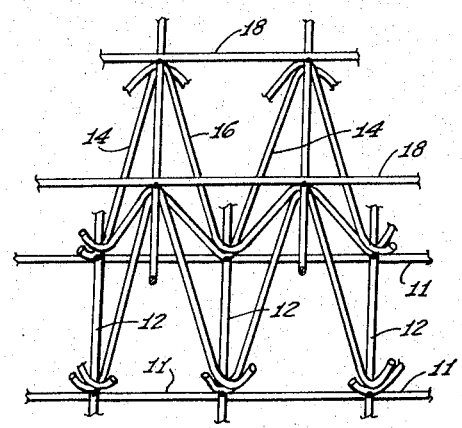
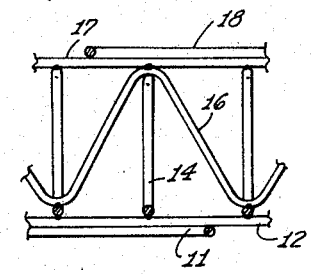
INVENTOR:
Jesse R. Hale
Attorney

3,298,402
METHOD FOR FABRICATING SPACE STRUCTURES
Jesse R. Hale, 14020 Budlong Ave., Gardena, Calif. 90247
Filed Feb. 15, 1965, Ser. No. 432,713
4 Claims. (Cl. 140—5)

This application is a continuation-in-part of my co-pending application Serial No. 419,357, filed December 18, 1964. This invention relates to a method for fabricating space structures, and more particularly to a method for fabricating space structures comprising pyramidal truss units sandwiched between flat wire mesh units.

In my co-pending application, Serial No. 419,357, methods are described for fabricating pyramidal space structures. This type of structure provides an improved strength-to-weight ratio and is generally much cheaper and easier to fabricate and assemble than other structures having equivalent characteristics.

A method is described in the aforementioned patent application for fabricating a basic pyramidal truss unit by bending flat welded wire mesh at the weld joints. To improve the rigidity of this pyramidal structure, this structure is sandwiched between flat welded wire mesh. This final structure has improved structural characteristics over the basic truss unit and is particularly suitable for forming a space truss core between a pair of flat slabs of building material.

The method of this invention provides a technique which greatly facilitates and lessens the cost of fabrication of such a space core structure. In the method of this invention, rather than bending the basic pyramidal trusses in one operation and then adding the meshes in subsequent operations, a unit, which includes the basic structural members for both the truss units and the mesh units, is first fabricated in a flat configuration. The space structures, including the mesh units attached thereto, are then formed in a single bending operation merely by urging adjacent alternate apices of the patterns formed by the flat structure in opposite directions.

It is therefore an object of this invention to provide an improved method for fabricating pyramidal space structures.

It is a further object of this invention to simplify the fabrication of pyramidal space structures.

It is still a further object of this invention to provide a method in which a pyramidal space structure comprising pyramidal truss units sandwiched between wire meshes can be fabricated in a single bending operation from a flat web of wire.

Other objects of this invention will become apparent from the following description taken in connection with the accompanying drawings, of which FIG. 1 is a perspective drawing of the basic flat structure formed in the method of this invention, FIG. 2 is a perspective view of the final structure formed by the method of this invention, and FIG. 3 is an elevation of the final structure formed by the method of this invention.

Referring now to FIG. 1, the basic flat structure formed in the method of this invention is illustrated. This structure is generally formed in an appropriate machine operation, either from grid wires or welded wire mesh. In forming the structure from grid wires, grid wires 11 are laid in parallel rows to form the bottommost grid structure. Laid next on top of grid wires 11 are parallel grid wires 12, grid wires 11 and 12 thus forming square meshes. Laid on top of grid wires 12 are grid wires 14, to form first transverse diagonals to the squares, and laid on top of grid wires 14 are grid wires 16 to form second transverse diagonals to the squares. On top of grid wires 16 are laid grid wires 17, which run parallel to grid wires 12 and bisect the squares formed by wires 11 and 12, and on top of grid wires 17 are laid grid wires 18 which run parallel to grid wires 11 and also bisect the squares formed by wires 11 and 12. Where all four grid wires come together, i.e., at points 21, they are welded together. Where only grid wires 17 and 18 cross, i.e., at points 23, no juncture is made. Thus, a diagonal pattern is formed with the cross points between all four wires being welded together and with no juncture being made at the cross-over points between two wires.

If so desired, this basic structure can also be formed from three welded wire mesh units. Two of these welded wire mesh units would include mesh squares of equal size, and would be comprised of grid wires 11 and 12 and grid wires 17 and 18 respectively. The third of these welded wire mesh units would be comprised of squares having one-half the area of the squares of the first two units and would be formed from grid wires 14 and 16. The welded wire mesh units would then be appropriately placed on each other to form the structure shown in FIG. 1.

The final truss structure as shown in FIGS. 2 and 3 is formed by pushing apices 21 of the flat structure in the directions indicated by the arrows shown in FIG. 1. Thus, by pushing the adjacent alternate apices in opposite directions in an appropriate bending machine, the desired end structure is obtained from the flat welded wire structure. In such bending, the wires are appropriately drawn to evolve the three dimensional structures from the flat structure.

Thus, the method of this invention provides an improved and simplified method for producing pyramidal space structures comprising trusses sandwiched between wire mesh units.

While the method of the invention has been described and illustrated in detail, it is to be clearly understood that this is intended by way of illustration and example only and is not to be taken by way of limitation, the spirit and scope of this invention being limited only by the terms of the following claims:

I claim:
1. A method for fabricating a space structure comprising the steps of
    forming a flat web from wire, said web comprising a plurality of square meshes having diagonal members running between the corners thereof and forming an X and cross members running between the opposite sides thereof, said cross members being halfway between the sides of said meshes and forming a "+,"
    joining the wires of said web together at all points where four of said wires cross, and
    forcing adjacent alternate apices formed at the wire juncture points in opposite directions to form a three dimensional pyramidal space structure.
2. The method as recited in claim 1 wherein the points where four wires cross are joined together by welding.
3. A method for fabricating a pyramidal space structure comprising the steps of
    forming a first flat wire mesh comprising a plurality of square mesh units from a plurality of grid wires,
    forming a second flat wire mesh comprising a plurality of square mesh units, the sides of second wire mesh units being equal in length to one half the diagonals of said first mesh units,
    forming a third flat wire mesh similar in size and configuration to said first mesh,
    placing said second mesh on top of said first mesh so that the sides of the mesh units of said second mesh form diagonals for the squares of said first mesh, placing said third mesh on said second mesh so that the sides of the mesh units thereof are located parallel to and halfway in between the respective sides of the mesh units of said first mesh, welding together the wires at all points where four wires cross, and forcing adjacent alternate apices fromed by the welded joints in opposite directions to form a three dimensional pyramidal space truss structure.

4. A method for fabricating a pyramidal space structure comprising the steps of placing a first group of grid wires in parallel rows equidistant from each other, placing a second group of grid wires on said first group in parallel rows equidistant from each other, the rows of said second group running normal to the rows of said first group and being spaced the same distance apart thereas, placing a third group of grid wires on said second group in parallel equidistant rows, the wires of said third group running diagonally through the cross points between the wires of said first and second groups, placing a fourth group of grid wires on said third group in parallel equidistant rows, the rows of said fourth group running normal to the rows of said third group, spaced the same distance apart thereas and running diagonally through the cross points between the wires of said first, second and third groups, placing a fifth group of grid wires on said fourth group in parallel equidistant rows, the rows of said fifth group being parallel to the rows of one of said first and second groups and spaced halfway therebetween, placing a sixth group of wires on said fifth group in parallel equidistant rows, the rows of said sixth group being parallel to the rows of the other of said first and second groups and spaced halfway therebetween, welding the wires together at all points where four of such wires cross, and forcing adjacent alternate apices formed by the welded joints in opposite directions to draw the wires, thereby forming a three dimensional pyramidal space truss structure.

References Cited by the Examiner

UNITED STATES PATENTS

| | | | |
|---|---|---|---|
| 1,842,121 | 1/1932 | Riley | 140—112 X |
| 1,961,991 | 6/1934 | Southwell | 140—112 |
| 2,191,682 | 2/1940 | Reed | 140—112 |
| 2,737,208 | 3/1956 | Harter | 140—7 X |

WILLIAM J. STEPHENSON, *Primary Examiner.*